Jan. 9, 1951

A. V. HAEFF ET AL

TUNING MEANS FOR ULTRA HIGH FREQUENCY SIGNAL GENERATORS 2,537,052

Filed Aug. 30, 1945

6 Sheets-Sheet 1

Inventors
ANDREW V. HAEFF
ROBERT H. MELLEN
CHARLES B. SMITH

By Ralph L. Chappell
Attorney

Jan. 9, 1951

A. V. HAEFF ET AL
TUNING MEANS FOR ULTRA HIGH
FREQUENCY SIGNAL GENERATORS 2,537,052

Filed Aug. 30, 1945

6 Sheets-Sheet 2

Inventors
ANDREW V. HAEFF
ROBERT H. MELLEN
CHARLES B. SMITH

By Ralph L Chappell

Attorney

Jan. 9, 1951 A. V. HAEFF ET AL 2,537,052

TUNING MEANS FOR ULTRA HIGH FREQUENCY SIGNAL GENERATORS

Filed Aug. 30, 1945 6 Sheets-Sheet 3

Inventors
ANDREW V. HAEFF
ROBERT H. MELLEN
CHARLES B. SMITH

By Ralph L. Chappell

Attorney

Inventors
ANDREW V. HAEFF
ROBERT H. MELLEN
CHARLES B. SMITH
By Ralph L. Chappell
Attorney Inventors
ANDREW V. HAEFF
ROBERT H. MELLEN
CHARLES B. SMITH
By Ralph L. Chappell
Attorney Inventors
ANDREW V. HAEFF
ROBERT H. MELLEN
CHARLES B. SMITH By Ralph L. Chappell Attorney Patented Jan. 9, 1951

2,537,052

UNITED STATES PATENT OFFICE 2,537,052

TUNING MEANS FOR ULTRA HIGH FREQUENCY SIGNAL GENERATORS

Andrew V. Haeff, Washington, D. C., Charles B. Smith, Silver Spring, Md., and Robert H. Mellen, United States Navy Application August 30, 1945, Serial No. 613,693

11 Claims. (Cl. 178—44)

(Granted under the act of March 3, 1883, as amended April 30, 1928; 370 O. G. 757)

This invention relates to high frequency s'gnal generators and more particularly to a signal generator of the resonant parallel line type employing an oscillation circuit including a vacuum tube connected to form a grounded-grid type oscillator for generat ng ultra-high frequency energy in the form of either unmodulated continuous waves or modulated by pulses.

In Patent No. 2,292,254 issued August 4, 1942 to J. M. van Beuren there is disclosed an ultra-high frequency generation system employing a resonant parallel-transmission line of arcuate shape arranged for diametrical rotation in combination with stationary short-circuiting members grounded to the casing for altering the electrical length of the high frequency generating portion of sa'd line as it rotates, means rotating with said transmission line to capacity load said line for increasing its normal electrical length to extend the frequency coverage as well as to mainta'n a suitable L/C ratio for the circuit and an oscillation circuit and apparatus including a vacuum tube connected to and rotating bodily with said parallel-transmission line. In accordance with th's prior art construction the rotary support for this arcuate transmission line comprises a pair of spaced insulating discs of polystyrene each secured to a rotatable metal shaft while around three-quarters of the periphery of each insulating disc is secured one of the conduct:ve arcuate rods or tubes which form the resonant parallel-transmission line. This resonant transmission line system, as thus arranged, is connected in a triode oscillator circuit to form a tuned-grid tuned-plate type of oscillator.

It is accord'ngly one object of the present invention to provide improvements in an oscillation generator system of this general prior art construction which will facilitate the generation of substantially large amounts of h'gh-frequency power at constant voltage over a wide frequency range and which will otherwise widen the application and use of an ultra-high frequency generator of this general resonant parallel-line type.

In accordance with the present invention there is provided an ultra-h'gh frequency generation system in the form of a grounded-grid oscillator wherein there is utilized a "lighthouse" type of high-frequency oscillator tube operatively connected in a resonant oscillatory circu't formed by the plate and cathode rod or tubular members of a rotatable arcuate resonant parallel transmission line system. These arcuate conductors of the resonant parallel transmission line are mounted on opposite sides of a conductive rotary support which is in the form of a grounded circular plate or disc connected to the grid of the oscillator tube. The disc and lines thereon are bodily rotatable with respect to stationary short-circuiting spring contact members which are in sliding engagement with each of the arcuate lines for tuning the active portions of said lines to control the desired frequency range of the oscillator. A pa'r of recessed bifurcated supports is provided each of which carries a grounding contact for the grid disc and one of the stationary shorting spring contacts for the arcuate conductors. The output voltage attenuator device is housed within a longitudinal apertured passage formed in the bifurcated support carrying the shorting finger for the anode conductor. Positioned across this shorting member in the high frequency field zone is a bolometer element which is connected to and forms one arm of a balanced bridge circuit of the power-level monitor. A regulated variable voltage power supply is provided containing a "protective" circuit for the bolometer element. A built-in pulser circuit also is provided for pulsing the osc'llator with a pulse of variable-rate, length and delay when pulse-modulated signals of ultra-high frequencies are to be generated.

Accordingly, a feature of the invention is the novel mounting arrangement of the oscillator tube, the grounded-grid central support disc, and the plate and cathode parallel transm'ssion lines whereby the entire assembly may be rotated bodily with respect to fixed shorting contacts during tuning of the oscillator to cover the operating frequency band thereof.

Other objects, features and advantages will be apparent in the following detailed description of a preferred embodiment of the invention made in connection with the accompanying drawings, in which.

Figure 15:
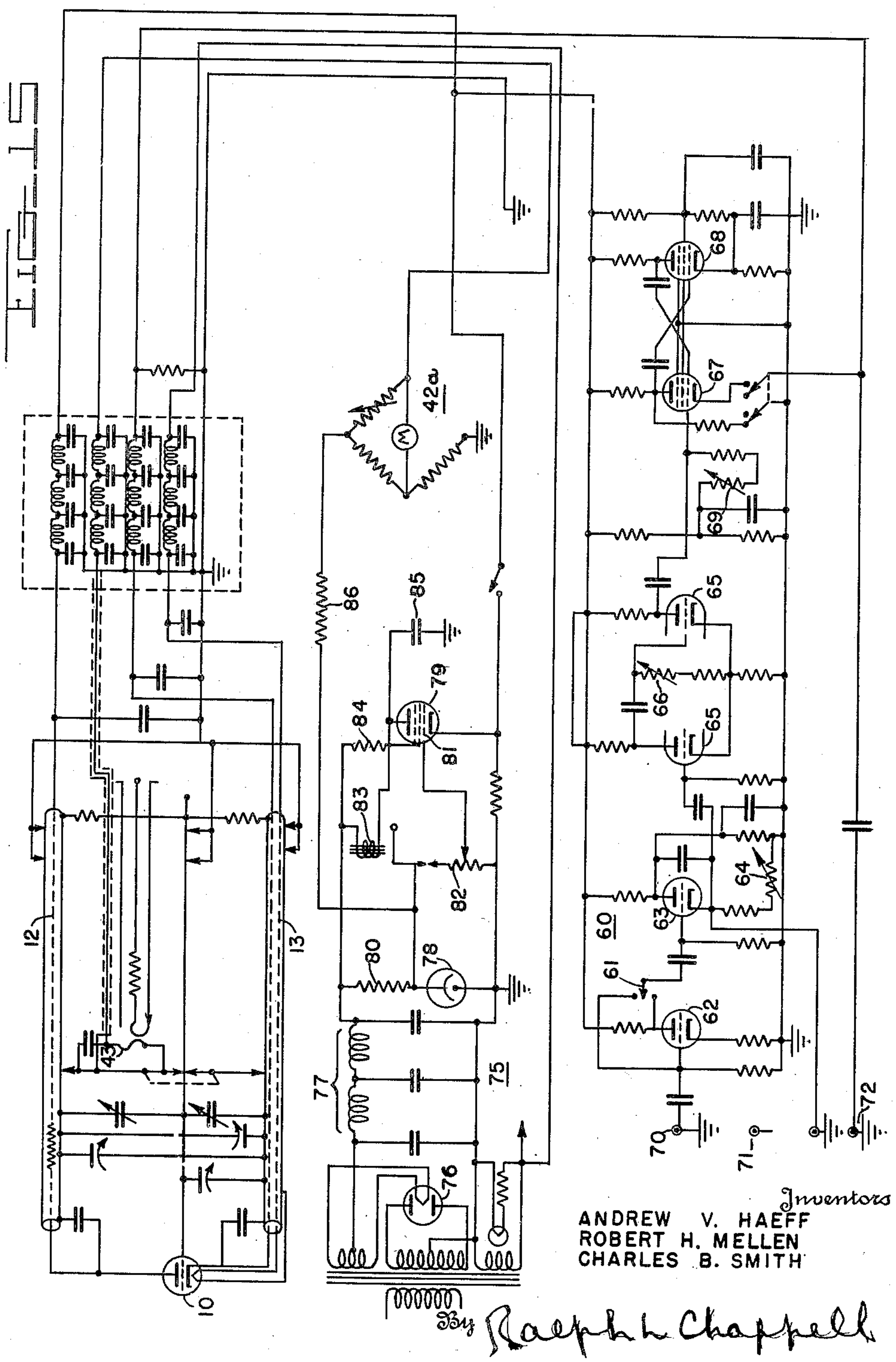
Fig. 15 is a schematic circuit diagram of the entire signal generator circuit including the power supply circuit and the internal pulser circuit.

Referring more particularly to Figs. 1 to 5 inclusive and Fig. 15 of the drawings the oscillator or signal generator there shown is of the variable inductance, tuned type and comprises a high-frequency oscillator tube 10 (see Fig. 2) which is shown as being a triode of stepped formation and of the type now commonly referred to in the art as a "lighthouse" tube (type 446), having a cathode, an anode and a control electrode. The tube 10 is shown connected in a grounded-grid oscillator circuit with tuned-plate and tuned-cathode line conductors 12 and 13 respectively which form the fundamental resonant circuit of the resonant parallel-line type. The conductors 12 and 13, respectively, may comprise either solid metal rods or metal tubes each of arcuate shape mounted on opposite sides of a rotatable mount 15 of conductive material such as, for example a metal disc or plate-like rotor, at the outer marginal edge portions thereof. The curved line conductors 12 and 13 are of similar size and shape, each being bent in the form of an incomplete circle of such arcuate length as to extend around approximately eight-ninths, or approximately 340°, of the peripheral marginal edge portions of the rotary disc 15. The rods or tubes 12 and 13 may be silver-plated, if desired, so as to increase their conductivity.

The rotatable mount 15 with its central hub 16 is secured, as by a key or otherwise, to a rotatable metal shaft 17 which, in turn, is mounted for rotation in suitable anti-friction type bearings in the central hub 18 of the casing 19 which forms the stator member of the oscillator. The oscillator tube 10 and plate and cathode transmission line conductors 12 and 13 respectively thus are mounted together in a center plate assembly and rotate bodily therewith during tuning of said lines to provide the desired operating frequency.

Rotational movement of the parallel line conductors 12 and 13 and the rotatable mount 15 in unison is obtained by means of worm wheel 20 suitably secured to shaft 17, as by tapered pins 21, the worm wheel 20 meshing with worm 22 secured to drive-shaft 23 which is rotatable in bearing members 24 and turned by means of hand wheel 25. As thus arranged, the plate and cathode lines 12 and 13 respectively and also the rotatable mount 15 therefor are rotated by shaft 17 relative to a multi-contact stationary short-circuiting device 30, presently to be described, adapted for tuning the active frequency determining portions of the arcuate conductors 12 and 13 simultaneously. The rotatable mount disc 15 and the transmission line conductors 12 and 13 as thus arranged can be angularly rotated through at least 270° to cover the normal operating band of frequencies of this oscillator. Tube 10 has its anode cap and cathode shell connected to lines 12 and 13 respectively by connector 27 and contractile band 29. Ring connector 28 connects the grid disc terminal to the rotatable mount 15.

The heater wires (not shown) to the cathode of the tube 10 pass through and are housed within the arcuate cathode conductor 13 of the parallel transmission line thus avoiding the use of R.-F. chokes since there is no R.-F. field present inside of the tubular conductor 13 which shields the heater wires and is of the proper length to act as a R.-F. choke. Similarly, the high-voltage plate supply lead (not shown) supplying high-voltage operating potentials to the anode electrode of tube 10 is confined within the arcuate hollow anode conductor 12 which acts as an R.-F. shield and choke.

Figure 9:
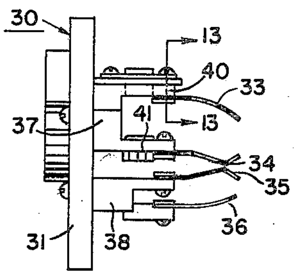
Fig. 9 is a side elevational view of the short-circuiting device depicted in Figs. 1, 2 and 8 showing the arrangement of the shorting contacts for short-circuiting the active frequency determining portions of the transmission line.
Figure 10:
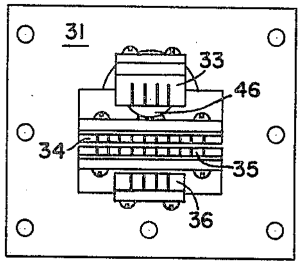
Figs. 10, 11 and 12 are end, bottom and top views of the short-circuiting contact device shown in Fig. 9.
Figure 11:
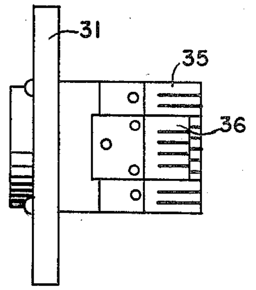
Figure 12:
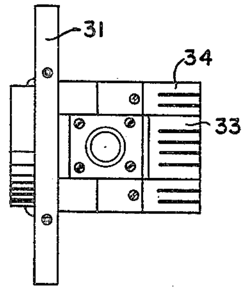
Figure 13:
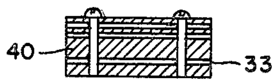
Fig. 13 is an enlarged cross-sectional view taken substantially on line 13—13 of Fig. 9.

Referring now to Figs. 9 to 12 inclusive wherein the stationary short-circuiting device is shown in greater detail the device 30 comprises the conductive support or metallic plate member 31 which is electrically grounded to the casing 19 while affixed to the support 31 are the concaved contact spring fingers 33 and 36 which respectively have sliding engagement with the line conductors 12 and 13. Thus, the electrical length of both conductors and of the parallel line is altered to vary the frequency as these arcuate conductors are rotated by shaft 17 and the rotatable mount 15 so as to include more or less of their physical length between the operating ends of said line and their respective shorting fingers. Spring contact fingers 34 and 35 have sliding engagement with opposite sides of the rotatable mount 15 and form wipers which ground the latter to an external grounding circuit as the disc rotates. As shown in Fig. 10 the fingers 33, 34 and 35, 36 are of a slitted read-like formation and supported in an overhanging relationship by the spaced bifurcated blocks 37 and 38 respectively which, in turn, are disposed one above the other and project from the same side of the common supporting base 31 to which they are secured. Blocks 37 and 38 may be made in two pieces as shown or they may be of a one-piece construction.

Figure 8:
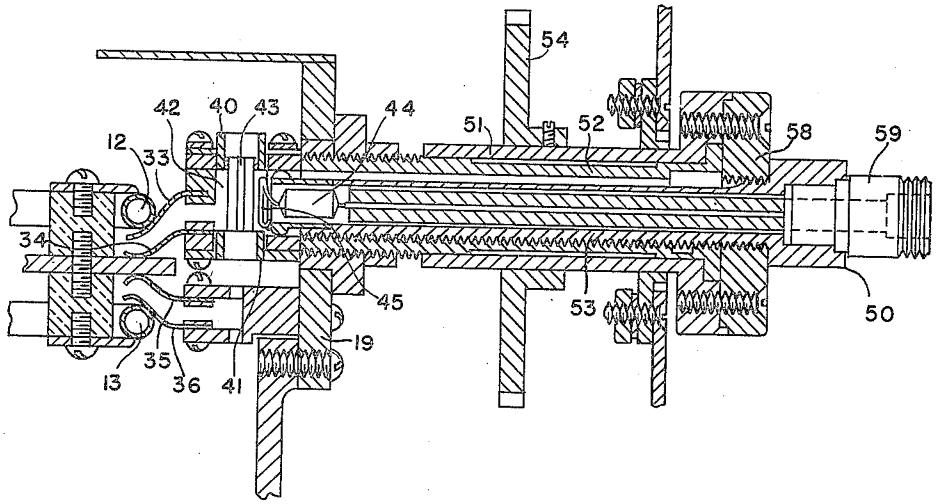
Fig. 8 is an enlarged longitudinal vertical section of the output voltage attenuator assembly shown in Figs. 1 and 2 showing details of its construction.

As illustrated in Figs. 9 and 10, block 37 carries the plate-shorting contacts and is of a bifurcated formation presenting substantially U-shaped structure with arms 40 and 41 between which is formed the recess 42, while across this recess and carried by the arms is placed a non-linear resistance element 43 (see Figs. 2 and 8) to operate as a bolometer. The resistor 43 is a cartridge-like element and is connected to and forms one arm of a balanced Wheatstone bridge circuit 42*a* (see Fig. 15) the balance of which is indicated by a suitable meter M such as a micro-ammeter mounted on the front panel of the apparatus. The indication of this meter will be proportional to the R.-F. power absorbed in the bolometer resistor element 43.

The output attenuator line 50 of the oscillator is terminated in a 50-ohm resistor 44 (see Fig. 8) and a one-half turn pick-up loop 45 which is coupled to the high frequency field in which the bolometer element 43 is operatively coupled. The output of the attenuator 50 is controlled by varying the inductive coupling relationship of the loop 45 with respect to the high frequency field in the recess 42, the pick-up loop 45 being longitudinally movable within and adjustable with respect to the cylindrically apertured passage 46 (see Fig. 10) communicating with the recess 42 in the support 31 of the stationary short-circuiting device 30.

Frequency indication is obtained by means of a geared revolution counter 48 (see Fig. 1), the readings of which may be interpreted as frequency by reference to individual calibration data usually supplied with the particular generator by the manufacturer. This assembly is so proportioned that the revolution counter 49 (see Fig. 1), which is geared to the attenuator mechanism 50, will indicate 10 digits per db. of attenuation.

Figure 1:
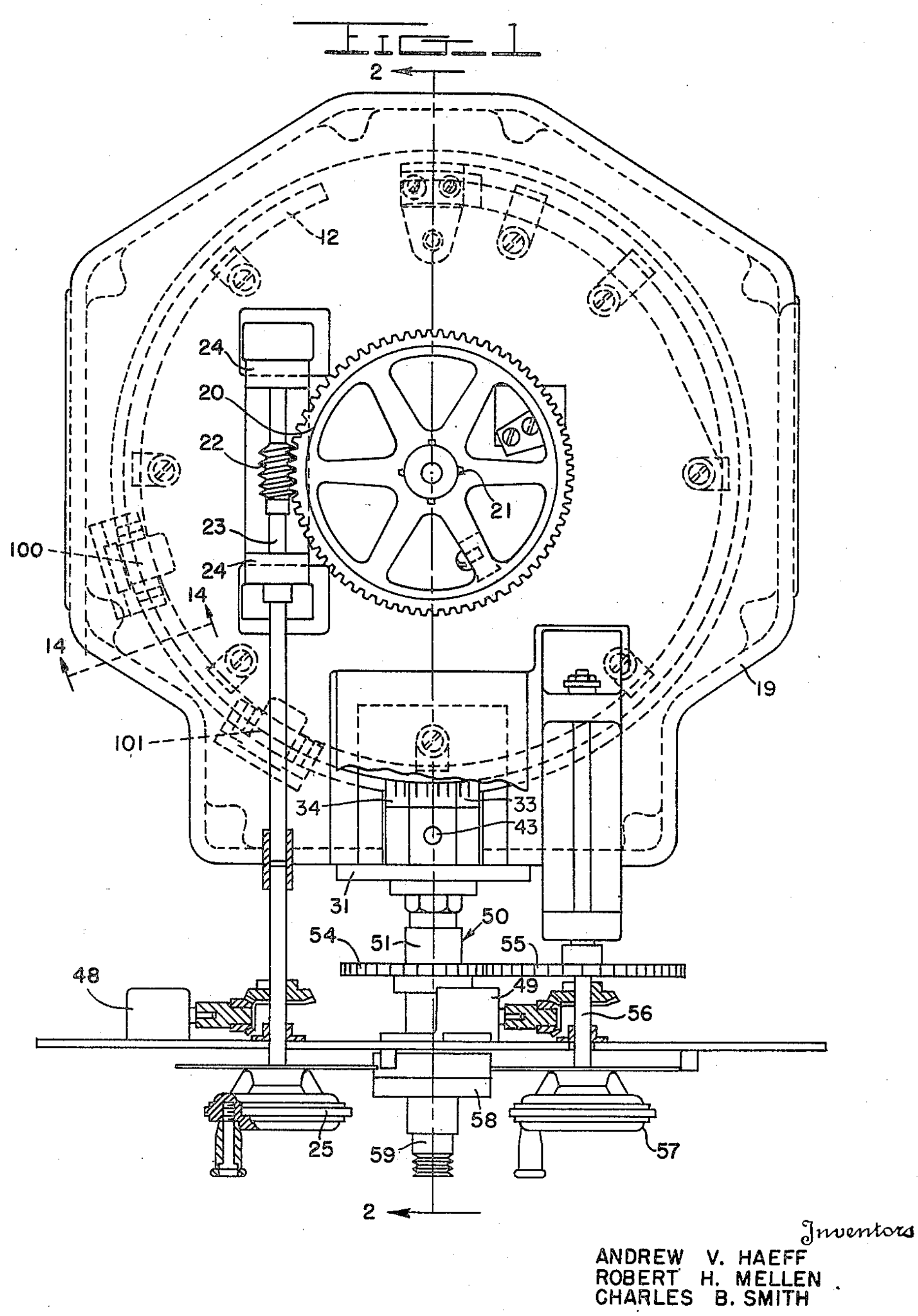
Fig. 1 is a top plan view of one practical form of the invention.
Figure 2:
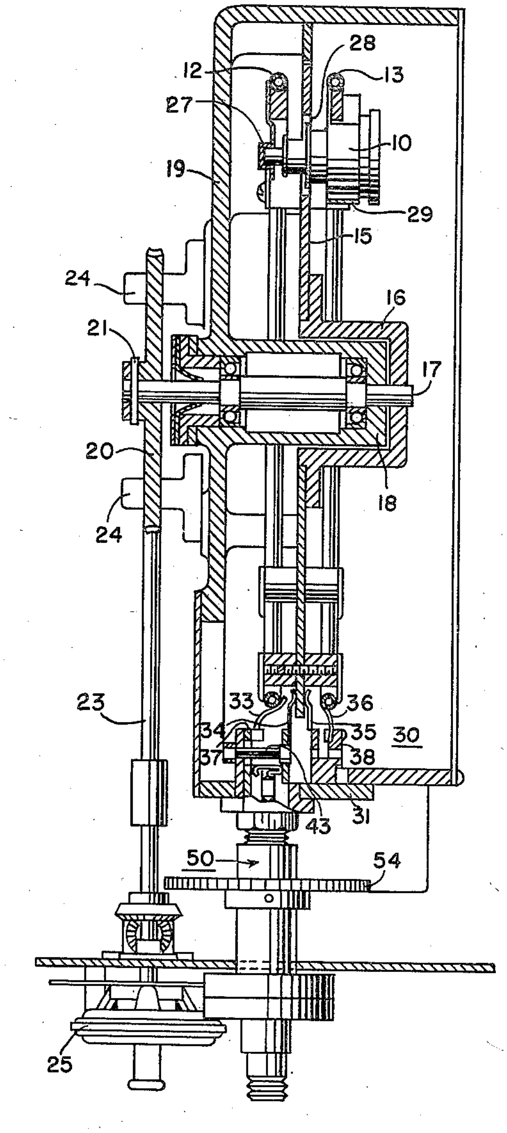
Fig. 2 is a long'tudinal sectional view of the apparatus shown in Fig. 1, taken substantially on the line 2—2 of Fig. 1.
Figure 3:
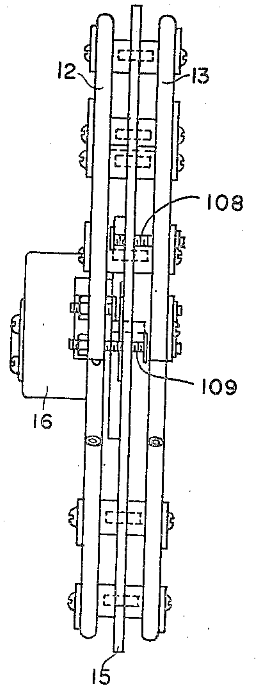
Fig. 3 is a side elevational view of the rotor assembly shown in Figs. 1 and 2 showing the resonant parallel transmiss'on line system in conjunction with the rotatable mount therefor.

As illustrated in Figs. 1 and 8, the output voltage attenuator 50, which serves to derive output radio-frequency energy from the oscillator, is of a conventional type employing a nut and threaded sleeve arrangement for propelling the pickup loop 45, and comprises an outer sleeve 51, an intermediate sleeve 52 attached to the casing 19, and an inner sleeve 53. The outer sleeve 51 is driven by a gear 54 secured thereon meshing with and driven by a gear 55 which, in turn, is rotated by shaft 56 and handwheel 57. The outer sleeve 51 is freely rotatable on the intermediate sleeve 52 and coupled through screw-thread means in end flange 58 to the inner sleeve 53 for either retracting or advancing, when desired, the inner sleeve 53 to vary and adjust coupling of the pick-up loop 45 relative to the high-frequency field present within the chamber 46. The output from the signal generator is obtained from the calibrated attenuator 50, the characteristic impedance of which is 50 ohms (resistor 44), and thence through the coaxial Amphenol connector 59. A four-foot flexible cable (not shown) is normally supplied with the equipment for connecting the attenuated generator output from terminal connector 59 to an exterior utilization device or load circuit. The maximum calibrated output voltage at the above mentioned impedance is substantially 100,000 microvolts, and the attenuator 50 is ordinarily calibrated to 120 db. below this level.

Figure 14:
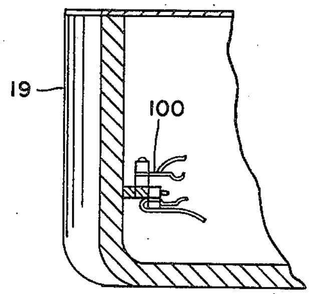
Fig. 14 is a fragmenting sectional view taken substantially on the line 14—14 of Fig. 1 showing the arrangement of the grounding and short-circuiting fingers for shorting the inactive portions of the transmission line.

Suppressors 100 and 101 (see Figs. 1 and 14) are used to prevent resonance of the trailing or tail portions of each of the arcuate conductors 12 and 13 respectively. Thus, a pair of suppressors 100 and 101 are placed along each of the arcuate conductors 12 and 13 at spaced points whose distance from one another is a quarter-wavelength whereby in accordance with the principles of U.-H.-F. transmission line theory, their action is such as to prevent excitation of the portions of these lines extending beyond the shorting points thereof where they are short-circuited by the spring fingers 33 and 36 respectively as the line is rotated.

Figure 4:
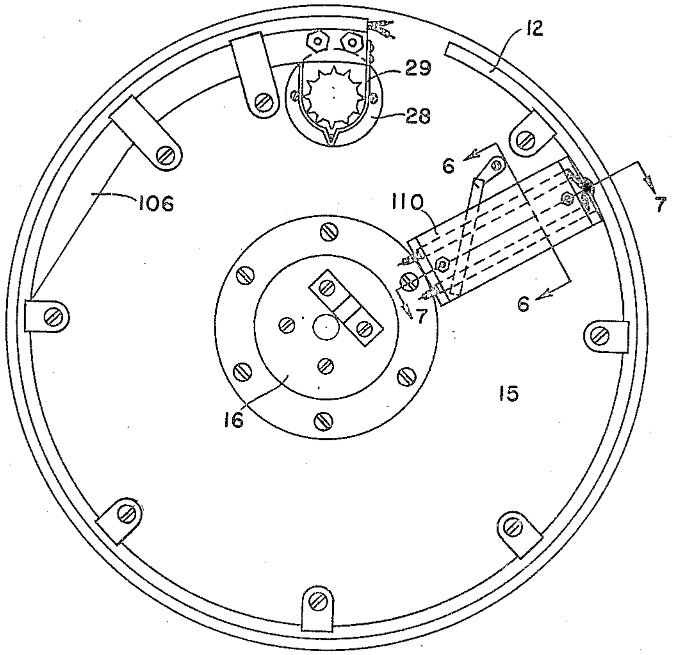
Fig. 4 is an end elevational view of the Fig. 3 rotor assembly as viewed from the left of Fig. 3.
Figure 5:
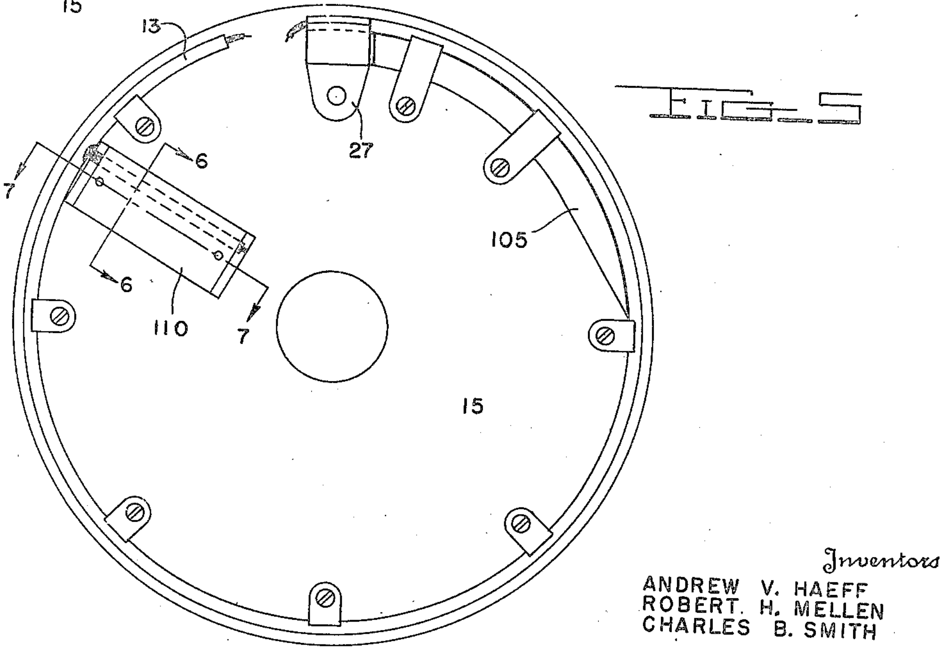
Fig. 5 is an end elevational view of the Fig. 3 rotor assembly as viewed from the r'ght of Fig. 3.

In Figs. 4 and 5, tapered flat metallic strip members 105 and 106 secured to the active or frequency determining end portions of the arcuate conductors 12 and 13 of the parallel transmission line provide an auxiliary transmission line effect which acts to vary the characteristic impedance of the parallel line conductors 12 and 13 to increase the frequency range of the line as a whole. Thus, this arrangement imparts a capacity loading to both line members at the active frequency-determining end portion of each to lower the low end of the frequency band and, in addition, minimizes inductance of the line at the high end of the frequency band.

Screw type trimmer condensers 108 and 109 are provided whereby the conductors 12 and 13 may be independently and separately trimmed, as desired.

Figure 6:
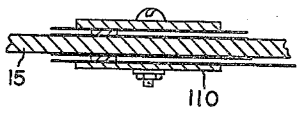
Fig. 6 is a cross-sectional view of the filter assembly shown in Figs. 4 and 5, taken substantially on the line 6—6 of the respective figures.
Figure 7:
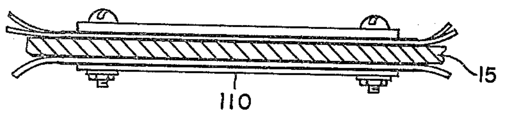
Fig. 7 is a longitudinal sectional view of the filter assembly shown in Figs. 4 and 5, taken substantially on the line 7—7 of the respective figures.

In Figs. 6 and 7 there is shown the R.-F. filter arrangement 110 which, in turn also functions as a by-pass condenser arrangement for enabling the radio-frequency energy to pass directly from the anode and cathode lines 12 and 13 to ground via the support 15.

In addition to the high frequency generating portion of the system, there is further provided, as shown in Fig. 15, the internal built-in pulse-generating and synchronizing circuits, the oscillator power supply circuit, and a safety circuit for the prevention of destruction of the bolometer element 43, the respective circuits just mentioned being presently described in the order abovementioned.

Thus, to effect the internal pulse modulation the signal generator circuit incorporates a built-in internal pulser circuit 60 which contains as the following principal elements an external synchronizing circuit, a repetition-rate oscillator, a time-delay circuit, and a pulse-shaping circuit. As shown in Fig. 15, the external synchronizing circuit consists of a single-pole double throw switch 61 for the purpose of selecting either the positive or negative peak of an external synchronizing voltage applied to terminals 70 and 71. The two positions of the switch 61 is illustrated select, respectively, the external signal directly or the same signal through the triode 62 adjusted for unity amplification and serving merely as a polarity reversing circuit. The repetition rate oscillator 63 is a gas discharge relaxation oscillator, the frequency of which is controlled by the variable resistor 64.

The time delay circuit comprises a dual-section triode vacuum tube 65 in a passive multivibrator circuit, the operating cycle of which is initiated by the output of the repetition rate oscillator 63. The recovery time of this circuit is controlled by resistor 66 which appears on the front panel of the signal generator and designated as a delay control.

The pulse shaping circuit comprises tubes 67 and 68 which are also connected to form a passive multivibrator. This circuit is actuated by the differentiated output of second triode section of tube 65. Control of the oscillator is accomplished by passing the cathode current of tube 67 through the cathode resistor of the oscillator tube; and since in a state of rest, tube 67 draws a large plate current, it acts to keep the oscillator at a bias beyond cutoff. During the operating cycle, tube 67 goes to cutoff for a period of time determined by the resistance 69, which appears on the front panel of the signal generator unit and designated as the pulse-width control. At the termination of its single operating cycle, this circuit restores itself to its original rest condition and remains that way until again excited by a pulse from the second triode section of tube 65. Internal pulse modulation may be obtained at repetition rates between 60 and 2000 cycles per second. The radio frequency pulses generated by this equipment have a useful frequency range of a ratio as high as 7:1, the range of frequencies generated being from 90 to 600 mc. The pulse width may be varied between 2 and 30 microseconds, and a delay circuit is provided to give continuously variable delay following the synchronizing pulses from 3 to 300 microseconds, the synchronizing pulses being obtained from an external source.

Provision is also made for external modulation of any form and for synchronizing the built-in pulser from an external signal of either polarity with respect to ground, this external modulating signal being supplied to the coaxial connector terminal 72. The modulating signal should be supplied from a line with an impedance of approximately 300 ohms.

Plate supply is obtained from the power supply circuit 75 a full-wave rectifier 76 and two-section filter circuit 77 which develops a full load voltage suitable for most of the tubes. A portion of the D.-C. is regulated by a gas discharge tube 78 (VR-150), which supplies the desired regulated D.-C. for the bolometer bridge circuit 42 and the oscillator plate supply regulator tube. The plate of the oscillator is fed from the cathode load of a cathode follower tube 79 (6AG7). The output voltage of the cathode follower 79 is determined by the grid voltage which is derived from the regulated portion of the power supply circuit.

Tube 78 and the 10 kc. resistor 80 supply a regulated voltage to the control grid 81 of the cathode follower tube 79 and to the bolometer bridge circuit 42*a*.

The 75 kc. potentiometer 82 controls the grid voltage and thus the cathode potential of tube 79 and the B+ voltage on the R. F. oscillator tube 10.

The relay 83 is a safety device such that when the current through the R. F. oscillator tube 10 and through the tube 79 becomes too high the relay 83 opens and removes the voltage. Resistor 84 is a shunt resistor to set the operating point of the relay 83. The condenser 85 (8 μfd. 250 v.) is a by-pass.

The 30 kc. 10 w. resistor 86 is a dropping resistor supplying the bolometer bridge 42*a*.

Cessation of the oscillations of tube 10, upon opening of relay 83, results immediately in the removal of radio-frequency power from the bolometer element 43; and therefore, with this circuit properly adjusted, there will be little likelihood of burning out the bolometer element 43. In order to insure continuous safe operation of this apparatus, the bolometer protective circuit should be checked for adjustment from time to time. It will be apparent that replacement of the bolometer element 43 will involve recalibration of the entire apparatus.

While there has been described a preferred embodiment of the invention, it will be obvious to those skilled in the art that various changes and modifications may be made therein without departing from the spirit of the invention, and it is, therefore, to be distinctly understood that no limitations are intended other than are imposed by the scope of the appended claims and limited by the prior art.

The invention described herein may be manufactured and used by or for the Government of the United States of America for governmental purposes without the payment of any royalties thereon or therefor.

What is claimed is:

1. In an ultra high frequency system, a casing, a rotatable conductive support therein, a parallel transmission line comprising two arcuate conductive members mounted on opposite sides of said support for rotation therewith, each of said lines being electrically insulated from said support, means for rotating said support, means operatively arranged for altering the electrical length of said transmission line as it rotates, and means grounding said support.

2. In an ultra high frequency system, a casing, a rotatable conductive support therein, a parallel transmission line comprising two arcuate conductive members mounted on opposite sides of said support for rotation therewith, each of said lines being in electrically insulated relationship with respect to said support, means for rotating said support, means grounding said support, stationary means operatively arranged for altering the electrical length of said transmission line as it rotates, and means operatively arranged to prevent resonance of the tail portions of both members of said parallel line.

3. In an ultra high frequency system, a casing, a rotatable conductive support therein, a parallel transmission line comprising two arcuate conductive members mounted on opposite sides of said support for rotation therewith, insulator means maintaining said arcuate line members in standoff relation from said support, means for rotating said support, means grounding said support, stationary means operatively arranged for altering the electrical length of said transmission line as it rotates, and means affixed to said casing slidably engaging the tail portions of both arcuate members of said parallel line at spaced locations thereof so as to prevent excitation thereof in any of the adjusted positions of said support and said transmission line.

4. In an ultra high frequency system, a casing, a rotatable conductive support therein, a parallel transmission line comprising anode and cathode resonant line members formed by two arcuate conductors mounted on opposite sides of said support in electrical insulated relationship thereto and for rotation therewith, means for rotating said support, a pair of spring contact means grounding said support, a stationary spring contact means operatively arranged with said arcuate conductors for altering the electrical length of said transmission line as it rotates, and fixed short-circuiting means engageable with and at such locations along the tail portions of said arcuate conductors to prevent excitation thereof.

5. In an ultra high frequency system, a rotatable conductive support, a parallel transmission line carried by said support comprising two arcuate conductive members one at each side of said support for rotation bodily therewith, means for rotating said support, stationary contact means operatively arranged to ground said support stationary contact means slidably engageable with and operatively arranged for altering the electrical length of said transmission line as it rotates, and means associated with the active frequency determining portions of each of said arcuate members so constructed and arranged as to vary simultaneously the characteristic impedance of both arcuate members of said parallel line for increasing the frequency range of the line as a whole for a given amount of rotation of said line.

6. In an ultra high frequency system, a metallic grounded rotary member, a resonant parallel transmission line comprising two arcuate conductive members mounted on opposite sides of said rotary member for rotation therewith and in electrically insulating spaced relationship therefrom, means applying high frequency energy to one end of said transmission line, means for rotating said rotary member, stationary short-circuiting means slidingly engaging each of said arcuate members of said transmission line and operatively arranged for altering simultaneously the electrical length of each of said arcuate members when said transmission line is rotated, recessed support means associated with the stationary short circuiting means for one of said arcuate line members, and an attenuator movable relative to said recess of said support means into variable inductive coupling relationship with the high frequency field therein.

7. In an ultra high frequency system, a casing, a central rotatable metallic disc member therein, a parallel transmission line on said disc but electrically insulated therefrom comprising two arcuate metallic members one mounted at each side of said disc for rotation bodily therewith, means for rotating said disc, means grounding said disc, a recessed member having a longitudinally apertured passage therein communicating with said recess, stationary short-circuiting springs supported by said recessed member on one side of the recess therein operatively arranged for altering simultaneously the electrical length of both members of said transmission line as it rotates, grounding means for said disc supported by said recessed member on the other side of said recess an attenuator longitudinally movable within the apertured portion of said support with respect to said recess, and said recessed member having a bolometer element supported thereon across said recess for connection to and forming one arm of a balanced bridge monitoring circuit.

8. Ultra high frequency apparatus comprising an enclosing receptacle, a rotatable shaft journaled therein, means including gearing operatively arranged for rotating said shaft, a circular disc-like member mounted on and rotating with said shaft, a parallel transmission line carried by and rotatable with said disc, said line being formed of two arcuate conductors of the same size placed one at each side of said disc in proximity to the outer peripheral edges thereof, short-circuiting means for altering the active length of said transmission line and for grounding said disc as said shaft rotates, means rotating with and grounding the inactive portion of said transmission line, and means cooperating with said short-circuiting means to provide an output circuit for said transmission line.

9. An oscillatory circuit comprising a rotatable conductive circular support, means for rotating said support, two parallel arcuate metallic conductors one arranged on each side of said support adjacent the outer circumferential marginal edge portions thereof and rotatable bodily with said support as it rotates, sets of stationary contact means each set in sliding engagement with one of said arcuate conductors and arranged to short-circuit the active portions of said conductors to ground as the said conductors are rotated in unison, and a plurality of fixed short-circuiting contact members mounted on said support and engaging said conductors at spaced quarter-wavelength intervals along the inactive portions of said conductors to ground the latter and prevent resonance thereof with the active frequency determining portions of said parallel conductors.

10. An oscillator circuit as set forth in claim 9, further characterized in this that the circular support is arranged for rotation within a metallic casing and that a conductive wiping brush is arranged to engage and connect the circular rotatable support to an external grounding circuit.

11. Ultra high-frequency apparatus as set forth in claim 4 wherein the supporting spring contact means for engaging and shorting the cathode and anode arcuate conductors and the pair of spring contact means for grounding the rotatable support each are of a slitted reed-like formation, and disposed one above the other in overhanging relationship from the same side of a common supporting base with each of said supporting spring contact means being co-supported with one of said pair of spring contact means on said common supporting base.

ANDREW V. HAEFF.
CHARLES B. SMITH.
ROBERT H. MELLEN.

REFERENCES CITED

The following references are of record in the file of this patent:

UNITED STATES PATENTS

| Number | Name | Date |
|---|---|---|
| 2,292,254 | Van Beuren | Aug. 4, 1942 |
| 2,326,519 | Burnside | Aug. 10, 1943 |
| 2,397,787 | Gubin | Apr. 2, 1946 |
| 2,404,261 | Whinnery | July 16, 1946 |